(12) United States Patent
Rodi

(10) Patent No.: US 6,512,589 B1
(45) Date of Patent: Jan. 28, 2003

(54) MEASUREMENT TRANSMITTER AND METHOD FOR MEASURING A POSITION OF A SENSING HEAD WITH RESPECT TO A SCALE EMBODIMENT

(75) Inventor: Anton Rodi, Leimen (DE)

(73) Assignee: HERA Rotterdam B.V, Rotterdam (NL)

(*) Notice: Subject to any disclaimer, the term of this patent is extended or adjusted under 35 U.S.C. 154(b) by 214 days.

(21) Appl. No.: 09/716,338

(22) Filed: Nov. 20, 2000

(30) Foreign Application Priority Data

Nov. 18, 1999 (CH) ............................................. 2104/99

(51) Int. Cl.⁷ ............................................. G01B 11/14
(52) U.S. Cl. ..................... 356/617; 250/231.18; 33/707
(58) Field of Search ................................ 356/617, 614, 356/616; 250/231.1, 231.18, 237 G, 231.14, 231.13; 33/707

(56) References Cited

U.S. PATENT DOCUMENTS

| | | | | |
|---|---|---|---|---|
| 4,572,952 A | * | 2/1986 | March ..................... | 250/237 G |
| 4,573,000 A | * | 2/1986 | Nelle ........................ | 318/640 |
| 4,948,968 A | * | 8/1990 | Matsui ..................... | 250/237 G |
| 5,129,725 A | * | 7/1992 | Ishizuka et al. ............. | 356/374 |
| 5,917,182 A | * | 6/1999 | Ishizuka ..................... | 250/237 G |
| 6,093,928 A | * | 7/2000 | Ohtomo et al. ............. | 250/231.13 |

FOREIGN PATENT DOCUMENTS

DE         195 18 714 A1    12/1995

* cited by examiner

Primary Examiner—Hoa Q. Pham
(74) Attorney, Agent, or Firm—Laurence A. Greenberg; Werner H. Stemer; Gregory L. Mayback

(57) ABSTRACT

A position of a sensing head, which contains at least one sensor, is measured with respect to a scale embodiment which contains a linear code. The measurement is performed such that a predefined resolution is achieved. Firstly, an absolute value of an initial position is determined with at least the predefined resolution, for example by evaluating the signals from all the sensors at a standstill. During the measurement, the sensing head and the scale embodiment are moved relative to each other. Fewer sensors are used than would be needed at a standstill, for example, only a single sensor is used. The information needed to achieve the predefined resolution is obtained from sensor signals of the relative movement, which are derived from the linear code. In this way, a signal for the absolute position and the number of revolutions is determined, even at high speeds. The limits set by signal processing and signal transmission are much higher than in the case of known measurement transmitters.

26 Claims, 3 Drawing Sheets

MEASUREMENT TRANSMITTER AND METHOD FOR MEASURING A POSITION OF A SENSING HEAD WITH RESPECT TO A SCALE EMBODIMENT

BACKGROUND OF THE INVENTION

FIELD OF THE INVENTION

The invention is in the field of measurement transmitters, in particular optical measurement transmitters for angles and/or distances.

Transmitter systems, which determine the absolute distance or angular displacement between a sensing head and a relatively shifted scale embodiment and which process measurement values with signal evaluation electronics for a further use, are known on the market. The scale embodiment has in this case a number of digital or analog signal tracks applied thereon.

In recent times, systems are increasingly described in the literature which have a serial absolute code, that is to say a "bit pattern" is applied in a track. These bit patterns are for the most part encoded using pseudo-random codes (PRCs) and are provided for evaluation with a basic interval of 1 bit, for example in optical systems having a number of equidistant photoreceivers (for example with 9 photodiodes in the case of 9 bits). In this case, however, for a further fine resolution of the absolute distance or angle information, an incremental track (basic resolution as absolute value) applied in parallel is also considered, with the generation of a SIN/COS signal, which can be interpolated appropriately (AD conversion). Thus a higher signal resolution is achieved by essentially using two tracks. Such a measurement transmitter is described in Published, Non-Prosecuted German Patent Application No. DE 195 18 714.8, for example.

Irrespective of the difficult signal processing both of the absolute values and of the SIN/COS signals in the distance transmitter and angle transmitter itself, it is not possible to achieve desired high resolutions. As the speeds or numbers of revolutions increase further in the respective technological applications (for example in the case of technologically advanced servo drives) currently possible signal processing speeds in electronic modules emerge as a limiting factor (for example in application-specific integrated circuits (ASICs), microprocessors and so on). A further limiting factor in advanced applications is the signal transmission over relatively long lines of, for example, a few meters in length. In the case of rotary encoders, for example, with 6,000 revolutions/min and 12-bit resolution, the resulting processing speeds are approximately 5 MHz.

If it is desired to evaluate the absolute value in the case of a serial code (see Non-Prosecuted German Patent Application No. DE-195 18 714.8) of for example at least 12 bits in an expedient way, without increasing the outlay on electronics and costs in the case of an ASIC developed for this purpose to an unacceptable extent, the obvious course is to clock out the 12 diode values (12 bits) serially. However, it becomes immediately apparent that the reading time=clock time×bit resolution=(1/clock frequency)×bit resolution will then be increased, and the continuous signal evaluation in real time is a limiting factor for many technological applications.

SUMMARY OF THE INVENTION

It is accordingly an object of the invention to provide a method and a device for position measurement which overcome the above-mentioned disadvantages of the heretofore-known methods and devices of this general type and which allow to increase the reading times or evaluation times approximately to the maximum clock time itself.

With the foregoing and other objects in view there is provided, in accordance with the invention, a method for measuring a position of a sensing head with respect to a scale embodiment, the method includes the steps of:

providing a sensing head including at least one sensor;

providing a scale embodiment including a linear code;

obtaining, with at least a given resolution, an absolute value of an initial position of the scale embodiment with respect to the sensing head;

moving the sensing head and the scale embodiment relative to one another for deriving sensor signals of a relative movement from the linear code; and measuring, with the given resolution, a position of the scale embodiment with respect to the sensing head by obtaining information from a first number of the sensor signals of the relative movement, the first number of the sensor signals of the relative movement being smaller than a second number of sensor signals required for a position measurement with the given resolution at a relative speed of zero of the scale embodiment with respect to the sensing head.

In other words, in order to measure the position of a sensing head, which contains at least one sensor, with respect to a scale embodiment which contains a linear code, in such a way that a predefined resolution is achieved, an absolute value of an initial position at at least the predefined resolution is obtained initially. During the measurement, the sensing head and the scale embodiment are moved relative to each other and fewer sensor signals are used than would be needed at a standstill, information needed to achieve the predefined resolution being obtained from sensor signals of the relative movement, which are derived from the linear code.

The invention is based on the idea of a "data compression" (with a certain analogy to the methods known in image processing). Data which change and are relevant are—when possible and practical—registered or recorded, transmitted and evaluated. Data which do not change and are redundant are ignored. This reduces unnecessary redundancy or avoids it altogether. Thus it is possible to reduce the quantity of data to be transmitted and processed.

The method according to the invention and the measurement transmitter according to the invention are particularly well suited for optical measurement systems; however, they can also be transferred to other measurement systems, for example to magnetic, electric and/or electrostatic systems. In order to explain the method and the measurement transmitter in terms of their basic principle and their action, an optical system will be explained below in an exemplary manner. In these exemplary embodiments, photodiodes are used for the detection of light; of course, other types of photodetectors or photoreceivers can also be used.

The invention makes use of the fact that the linear code is moved bit by bit past an observer, for example past an individual photodiode. If the code formation law is then known and the relative movement between the sensing head and the scale embodiment sweeps over or exceeds at least the step width of the bit resolution for absolute values, then the positional location can be determined from this point on. Thus, for example in the case of an absolute transmitter with a 12-bit PRC (pseudo-random code), at a standstill, 12 photodiodes are needed to determine the absolute position.

If the sensing system is then moved in a relative manner by at least these 12-bit positions (=step width of the resolution) then from this point on, through the use of the inventive idea, the evaluation of the 12 photodiodes needed at a standstill can be dispensed with and the evaluation system can be reduced virtually down to a 1-bit photodiode.

This has significant advantages, since in this way only one photodiode is sufficient for determining the absolute position, and therefore the limiting speed of the transmitter system can be brought up to the clock frequency to be processed. In the example presently being explained, with a 12-bit absolute code, the limiting speed can then be increased by the factor 12. This turns out to be even higher in practice in the case of integrated photodiodes, since special measures which increase the switching frequency can easily be made for a photodiode. The absolute values can therefore then be determined at high speeds and under real-time conditions, so that the limiting rotational speed of about 1000 rev/min, which currently limits the measured-value transmission in 12-bit absolute rotary encoders, can be shifted upwards significantly. For high-resolution servo systems, this is the sought-after solution in application use. It is therefore also possible to dispense with the analog SIN/COS signal lines, which are sensitive to interference, and which still lead to the outside to the evaluation electronics (e.g. servo drive control system) and are currently widespread on the market. This simplifies cable routing (to some extent over long distances) and makes the driver and evaluation electronics (e.g. AD converters, "sample and hold" amplifiers and so on) superfluous. In addition to the savings in cost, this therefore also permits the handling of the transmitter signals on site by a user, which is easy in terms of cables and electronics.

According to another mode of the invention, only a single sensor is used when deriving the sensor signals of the relative movement and this single sensor is preferably disposed in a central area of the sensing head. The reduction in the number of receivers which is hereby possible in the case of movement or speed additionally has the advantage that, for example, in the case of optical systems, optimum contrast illumination and an imaging system which is least susceptible to distortion can be taken into account by the photodiode or photodiodes located in this optimum area being used to form the absolute value. As a rule, this is approximately at the center, for example in our selected optical system with 12-bit evaluation, the 6th or 7th photodiode. This achieves not only a further increase in the limiting speed; but, for higher limiting frequencies, the illumination system, the adjustment and the signal evaluation during operation become much more robust and less critical for long operational use.

The number of photodiodes used for the measurement can be defined from the start to be a constant value, for example, one. However, it can also vary dynamically. For example, the variation can firstly be carried out in accordance with a predefined program or, secondly, automatically as well, for example, on the basis of the current speed. Low speeds permit a higher number of photodiodes to be used and vice versa. The higher the absolute certainty in each resolution step is desired, the higher the number of photodiodes used has to be selected. In industrial practice, however, one photodiode already permits the redundant checking of the measurement transmitter for half of the resolution steps per revolution which already far exceeds an expedient level of checking.

In accordance with a further mode of the invention, all of the sensors in the sensing head are used for determining the absolute value of the initial position of the sensing head with respect to the scale embodiment at a relative speed that is low or zero.

The absolute position must be ascertained, determined or read in once at least at the start of the measurement. The determination of the absolute position in the case of a system with a linear code can be done, as described further above, at a standstill or at a slow relative speed between the sensing head and the scale embodiment, by the apparatus itself, using a large number of photodiodes in accordance with the necessary resolution—e.g. 12 photodiodes for a 12-bit resolution. The term "slow relative speed" is to be understood here to mean a relative speed at which the problems mentioned in the introduction do not occur in the signal processing and signal transmission at full resolution.

As an alternative to this, the following variant of the method according to the invention is suggested. During the start-up, a small relative movement of the measurement system can always be made. In the case of a rotary encoder with 12-bit resolution, for example, there are 4096 steps per revolution, which only have to be moved by $\geq 11$ bit steps, which corresponds to an angle of about 1°. In general, according to this embodiment, in order to determine the absolute value of the initial position, the sensing head and the scale embodiment have to be moved relative to each other by at least $$\Delta L \geq (N-n) \cdot L/2^N,$$

where N is the resolution in bits, n is the number of sensors used and L is the code length. In this way, in application systems, absolute measurement transmitters with systems reduced to one photodiode can be implemented cost-effectively with a linear code.

In addition, such simplified systems can also be used where, after the measurement system has been switched off, no further relative movement between the sensing head and the scale embodiment takes place, and the last absolute value is stored in the overall system (or in the transmitter). Battery-operated systems are particularly suitable for this simplified sensor evaluation, since there is virtually no longer any voltage interruption during use.

In accordance with another mode of the invention, the sensors are switched on and off as required during the measurement.

The absolute position can also be received from the outside, for example from another measurement system.

It is expedient to use at least one fixed comparison of PRC values during one revolution (start to end of the linear code) in order to compare the positions and to set the positions. A counter can be set to zero or a specific value, for example at least once during the revolution. The system therefore becomes very insensitive to interference and synchronizes itself in the event of any faults occurring.

This point of view additionally favours the implementation of the formation of the absolute value over the entire speed range in an evaluation system in the transmitter itself, since only in this way is it possible to ensure permanent synchronism. In systems with absolute-value formation only at a standstill or at a low speed, and otherwise via SIN/COS signals, with the control system separated from the transmitter, synchronism is not entirely ensured, and this can lead to large consequential damages in the case of faults. This is particularly critical in the case of machines in continuous operation (e.g. over one or more working shifts) and in the interference-affected industrial environment of the control systems.

Various methods of forming the absolute value are possible, and always have the task of converting the linear code (e.g. PRC) into a binary code (2-based system) which is usual for digital signal processing. This is either done directly via known algorithms, via look-up table methods, or in an indirect way through the use of counters and comparators.

In accordance with a further mode of the invention, a measurement electronic circuit is switched on at least once for a measurement evaluation period after sweeping over an entire sectional length of the linear code.

In accordance with yet a further mode of the invention, the number of sectional lengths of the linear code that have been swept over is stored.

In accordance with another mode of the invention, a fine resolution is provided by using, in addition to the linear code, at least one incremental code for a measurement.

The multiturn application via counting the "sections"/revolutions is directly possible with the invention, so that the conventionally separate revolution counters (gearwheels, reed contacts or separate magnets or magnetoresistive systems, and so on) can be dispensed with. The direction-dependent revolutions can therefore be stored in real time. The apparatus according to the invention supplies a signal for the absolute position and the number of revolutions at full speed, without a separate zero track being needed.

With the objects of the invention in view there is also provided, a measurement transmitter, including:

a sensing head having at least one sensor;

a scale embodiment having a linear code;

the sensing head and the scale embodiment being movable with respect to one another;

the sensing head being configured for deriving, from the linear code, sensor signals of a relative movement of the scale embodiment with respect to the sensing head;

a first evaluator connected to the sensing head for determining an absolute value of an initial position of the scale embodiment with respect to the sensing head; and a second evaluator connected to the sensing head for obtaining information about a position of the sensing head with respect to the scale embodiment from the sensor signals of the relative movement.

In other words, the measurement transmitter, which is preferably an optical measurement transmitter, includes a sensing head which contains at least one sensor, a scale embodiment which can be moved relative to the sensing head and which contains a linear code, and a device for determining an absolute value of an initial position, a device for obtaining information about the position of the sensing head with respect to the scale embodiment from sensor signals of the relative movement, which are derived from the linear code.

In accordance with another feature of the invention, the second evaluator obtains the information about the position of the sensing head with respect to the scale embodiment from sensor signals obtained from only one of the sensors, which is preferably disposed in a central area of the sensing head.

In accordance with another feature of the invention, the sensing head has a central area; and the at least one sensor is disposed in the central area.

In accordance with yet another feature of the invention, the at least one sensor is at least one photodiode.

In accordance with yet another feature of the invention, the first evaluator for determining the absolute value of the initial position includes a storage device.

In accordance with a further feature of the invention, the first evaluator for determining the absolute value of the initial position includes a take-over device for receiving the absolute value of the initial position as an external value from outside.

In accordance with yet another feature of the invention, the scale embodiment has a pseudo-random code as the linear code.

In accordance with another feature of the invention, the linear code has sectional lengths; and a storage device stores a number of the sectional lengths having been swept over.

In accordance with yet another feature of the invention, the scale embodiment has, in addition to the linear code, at least one incremental code for providing a fine resolution.

In accordance with a further feature of the invention, the sensing head is an optical sensing head. Other features which are considered as characteristic for the invention are set forth in the appended claims.

Although the invention is illustrated and described herein as embodied in a measurement transmitter and a method for measuring a position of a sensing head with respect to a scale embodiment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
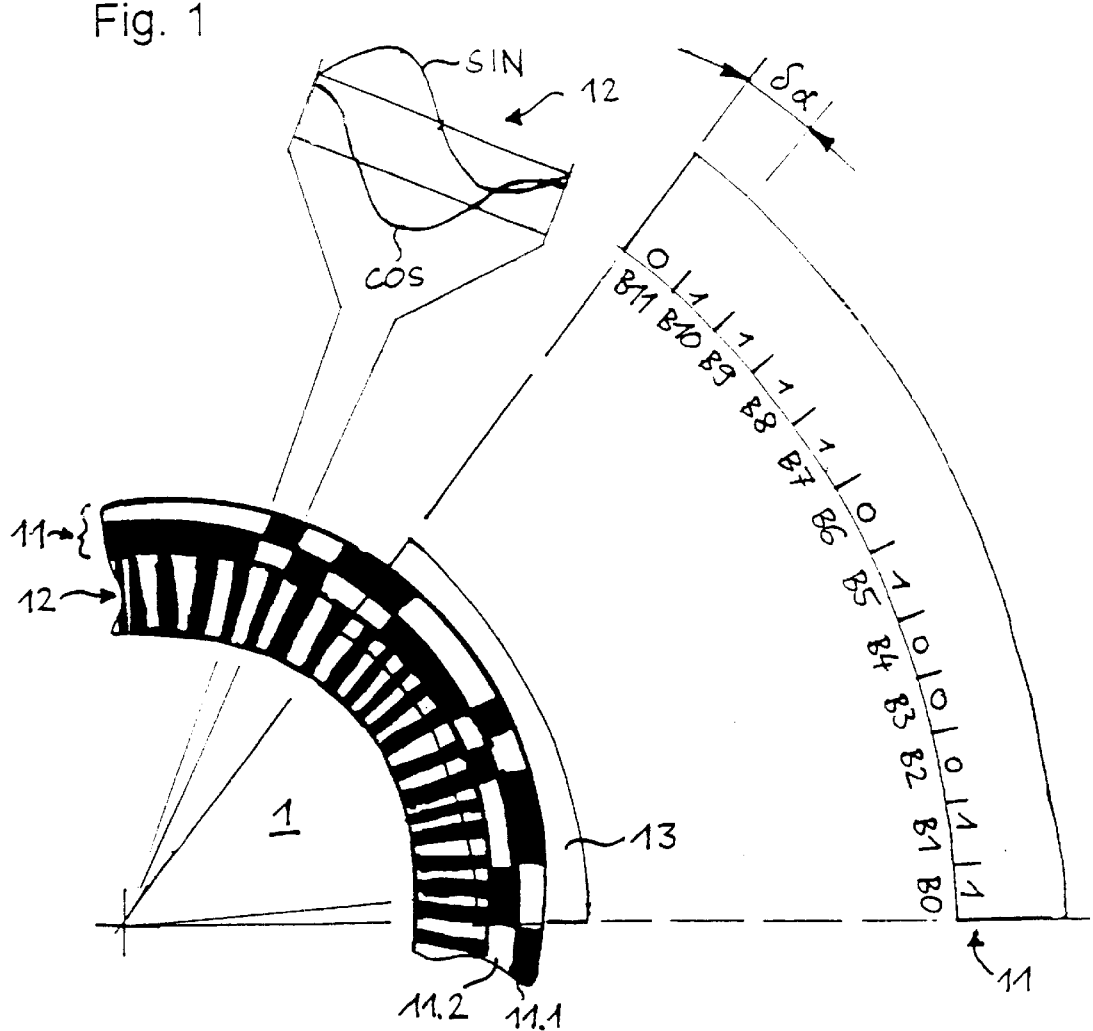
FIG. 1 is a partial diagrammatic view of an optical measurement transmitter.

Referring now to the figures of the drawings in detail and first, particularly, to FIG. 1 thereof, there is shown a part of an optical rotary encoder or optical rotary transmitter in accordance with Published, Non-Prosecuted German Patent Application DE 195 18 714.8, which is hereby incorporated by reference in the present specification. The optical rotary encoder shown in FIG. 1 may for example be used in accordance with the invention. Applied to a scale embodiment 1 is a serial or linear binary code 11, for example a pseudo-random code (PRC). The linear code 11 can be implemented, for example, as a sequence of transparent and opaque areas (which can be represented schematically as 1 or 0) on a glass disc (scale embodiment 1). Each 1 and 0 constitutes a bit in the linear code. For the purpose of a tried and tested differential signal formation, it is preferable to have two code tracks 11.1, 11.2 applied, which contain the same code but are inverted with respect to each other (if there is a "1" on the first code track 11.1, then there is a "0" on the second code track 11.2 and vice versa). The entire section length (here, for example, 360°) of the linear code 11 is subdivided in accordance with a predefined resolution (for example 12 bits) into coarse steps with a length δα (for example δα=360°/2¹²≈0.09°). A part 13 of the scale embodiment 1 is imaged onto sensors or detectors on a sensing head, or the sensors receive the direct shadow cast by the part 13 of the scale embodiment 1 to be read out. The sensing head contains 12 photodiodes, for example, which are essentially disposed alongside one another in a line and whose mutual spacing (taking into account an appropriate imaging scale) corresponds to the coarse step length δα. The 12-bit observation window formed in this way therefore has a length of, for example, 12δα (≈1°). As Published, Non-Prosecuted German Patent Application DE 195 18 714.8 describes, an incremental track 12 (SIN/COS signal) can also be applied on the scale embodiment 1, in addition to the binary code, for the purpose of a fine resolution.

Figure 2:
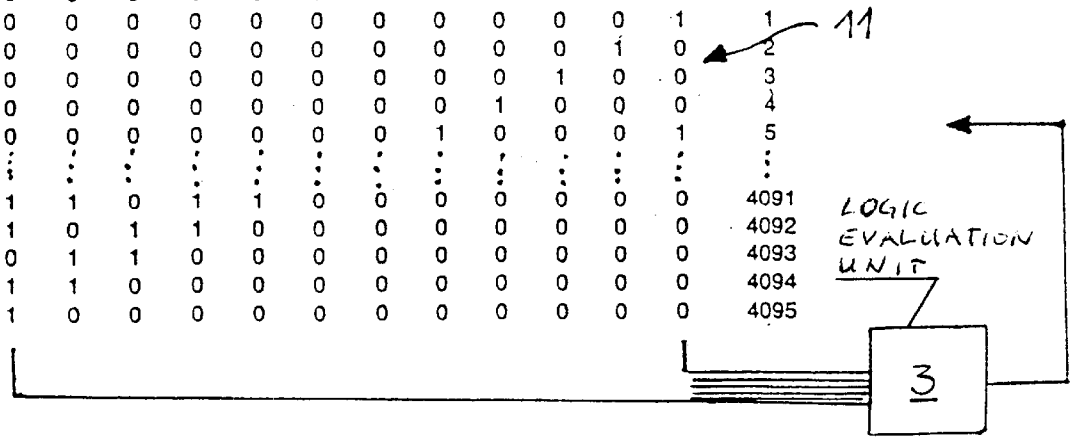
FIG. 2 is an illustration of parts of a pseudo-random code in an observation window of 12 bits in various positions.

Parts of a pseudo-random code 11 in an observation window of 12 bits B0, B1, ..., B11 in various positions 0, 1, ..., 4095 are listed in FIG. 2. The signals B0, B1, ..., B11 from the 12 photodiodes are evaluated together in a logic evaluation unit 3. The respective position 0, 1, ..., 4095 can be inferred unequivocally from the 12 bit signals.

Figure 3:
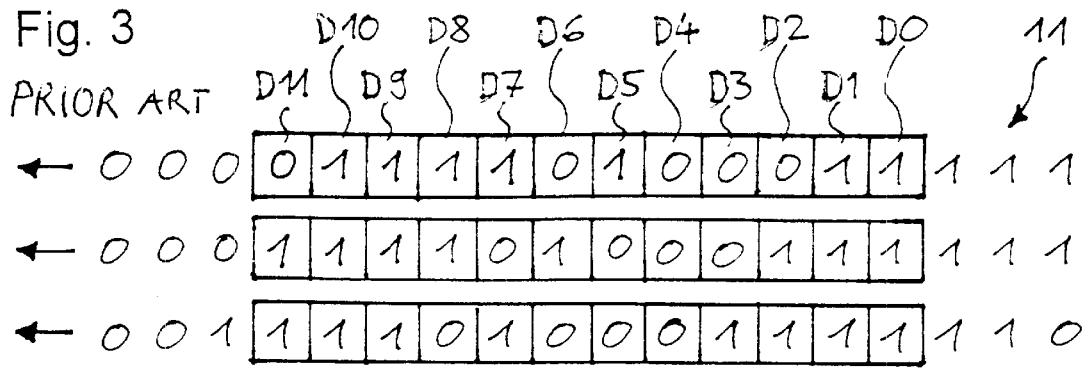
FIG. 3 is an illustration of a pseudo-random code with an evaluation according to the prior art.

A part of a pseudo-random code 11 which moves past 12 photodiodes D0, D1, ..., D11 in the direction of the arrows in three successive steps is illustrated in FIG. 3. In a measurement method according to the prior art, as shown in FIG. 3, in each step all 12 photodiodes D0, D1, ..., D11 are needed in order to determine the position. If the scale embodiment 1 moves by one bit relative to the sensing head, the result is simply that a new bit (new B0) is added and a known bit (old B11) vanishes, while the remaining 11 bits (old B0–B10) remain unchanged. These 11 unchanged bits therefore constitute redundant information.

Figure 4:
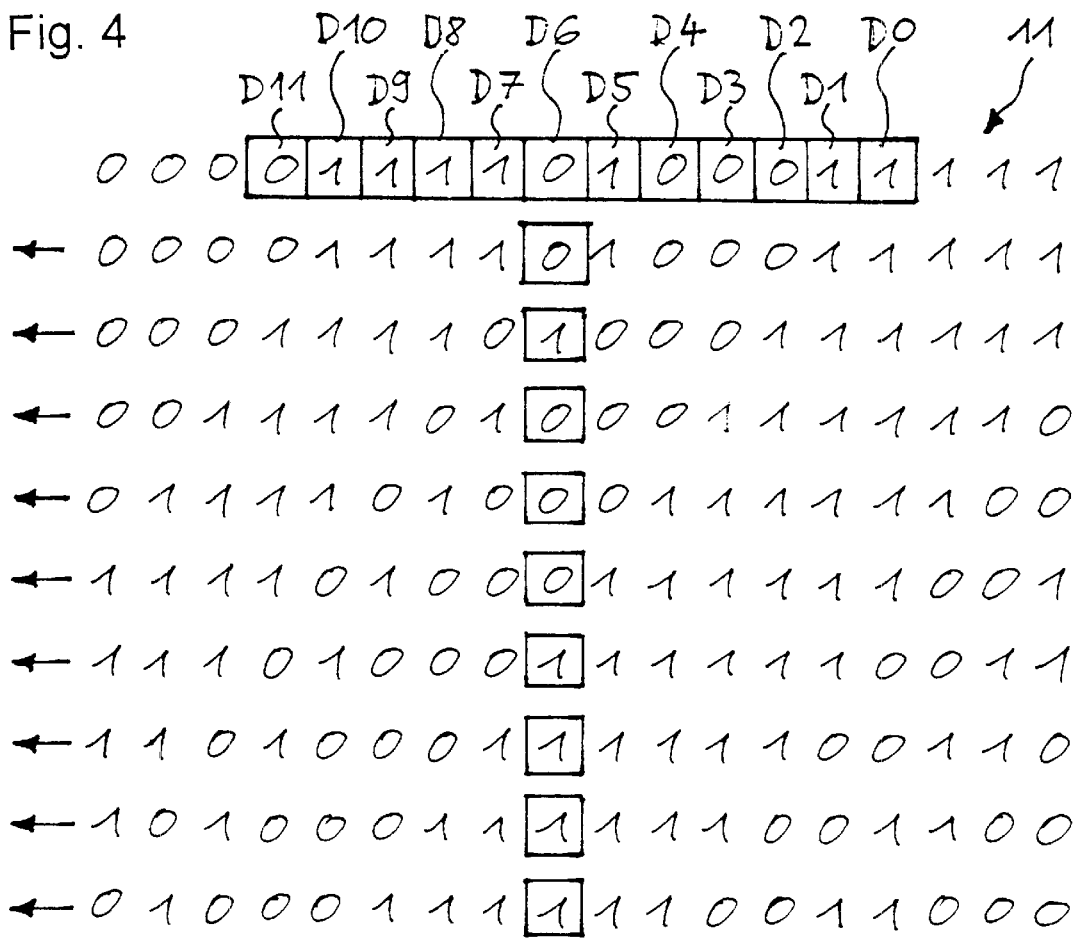
FIG. 4 is an illustration of a pseudo-random code with an evaluation according to the invention.

The invention dispenses—at least to some extent—with this redundant information, as shown in FIG. 4. Firstly, although it may be necessary to use all 12 photodiodes D0, D1, ..., D11, in order to determine the absolute value of the initial position when at a standstill, during the actual measurement not all 12, but fewer photodiodes are used—for example a single photodiode D6, which is preferably located at the center of the line of photodiodes D0, D1, ..., D11 and is therefore referred to below as the "center bit" photodiode. This single center bit photodiode D6 suffices to supply adequate relevant information about the absolute value of the mutual position of the scale embodiment 1 and the sensing head.

Figure 5:
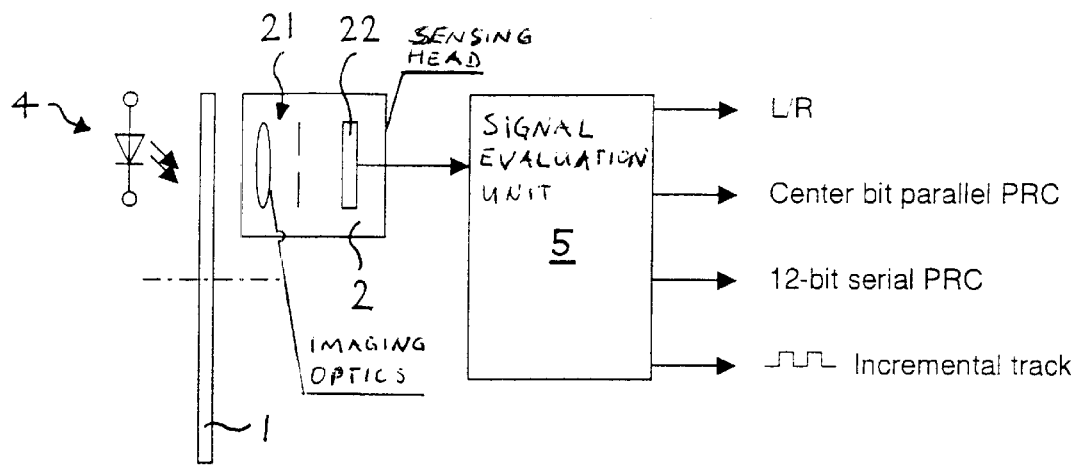
FIG. 5 is a schematic view of a measurement transmitter according to the invention.

In FIG. 5, a preferred embodiment of the invention is described in more detail. The optical measurement system contained therein includes a scale embodiment 1 configured as an optical encoder disc, and a sensing head 2. The encoder disc 1 is configured as a glass disc with chromium coding, for example, and essentially has two scale embodiment tracks, namely a PRC-absolute track and an incremental track (SIN/COS signal).

The sensing head 2 contains imaging optics 21 and a photoreceiver circuit ASIC 22 which is present for forming the signal and is integrated in the sensing head 2 (see Published, Non-Prosecuted German Patent Application DE 195 18 714.8). In the latter, SIN/COS signals are formed from the incremental track—in each case between one bit of absolute resolution—and the 12 photodiodes, with a specifically wired "center bit photodiode" (e.g. the seventh photodiode), are also prepared for signal evaluation. The light source used is, for example, a light-emitting diode 4. The output signals for forming the increment, left/right movement, center-bit (parallel PRC) value and 12-bit serial (PRC) value are led out from a signal evaluation unit 5 and, in a subsequent functional combination, can be used for forming the absolute value in the binary code.

Figure 6:
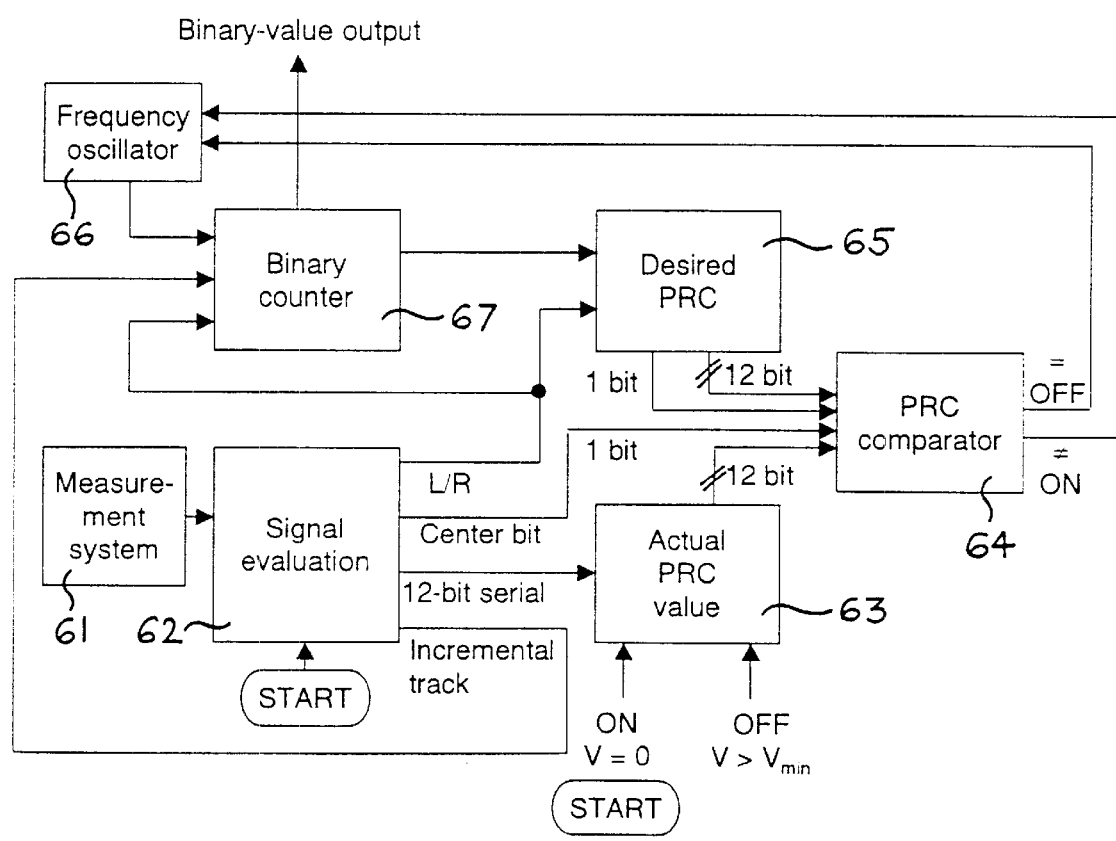
FIG. 6 is a block diagram of a measurement transmitter according to the invention.

The functioning of the measurement transmitter of FIG. 5 will be explained using the block diagram of FIG. 6. After the "start" of the system, which takes place at an initial time at a standstill, the measurement system 61 transmits the 12-bit absolute value via the channel "12 bit serial" to an actual PRC counter 63 via the signal evaluation 62. The actual PRC counter, equipped as a shift register, supplies at the output the 12-bit absolute value to a PRC desired/actual comparator 64.

At this point, a "desired PRC" 65 supplies no absolute value or a deviating absolute value, so that the comparator 64 activates a frequency oscillator 66 which in turn starts a binary counter 67. The binary counter 67 starts counting (at a high oscillator frequency) from "zero" (starting point) and, with the formation law, forms the desired PRC value 65, which also has the counter embodied as a shift register. The binary counter 67 continues to count up until the desired PRC value 65 and the actual PRC value 63 at the 12-bit absolute values at the PRC comparator 64 are equal. The frequency oscillator 66 is then stopped by the PRC comparator 64. The 12-bit absolute value then present at this time (the binary counter 67 is likewise configured as a counter embodied as a shift register) is the binary value which corresponds to the actual PRC value 63 and which is output to digital control electronics for further processing.

If, by a relative movement between the sensing head 2 and the scale embodiment 1, the measurement system applies a clock signal to the binary counter 67 via the switched-on signal evaluation 62 and relating to the incremental track, then the signal L/R at the output of the signal evaluation 62 is used to form the desired PRC value, via the aforementioned formation law, via the counter reading which has been counted up by one step in accordance with the direction of rotation. At the same time, at the output of the signal evaluation 62, the "center bit" of the 1-bit absolute value is present in accordance with the position (also encoded in PRC by the linear code, for example the disc 1 of a rotary encoder).

The desired/actual PRC comparator 64 then compares, at the input, the respective 1-bit values from the desired PRC 65 and the "center bit" from the signal evaluation, which must agree. Therefore, at the output of the binary counter 67, the correct 12-bit binary value is available in the correct sequence for further processing. If the PRC comparator 64 determines "inequality", the frequency oscillator 66 is activated, and brings the binary counter 67 very rapidly and L/R-dependently to that positional point at which the PRC comparator 64 reports "equality". The binary counter 67 then has the correct absolute value as a binary value to output.

The "clocking" of the sensor described above permits power-saving operation of the transmitter, so that effective battery operation can take place. Since the total absolute value is always present during a revolution, the measurement system needs to be switched on only briefly at least once during the revolution.

I claim:

1. A method for measuring a position of a sensing head with respect to a scale embodiment, the method which comprises:

providing a sensing head including at least one sensor;
providing a scale embodiment including a linear code;

obtaining, with at least a given resolution, an absolute value of an initial position of the scale embodiment with respect to the sensing head;

moving the sensing head and the scale embodiment relative to one another for deriving sensor signals of a relative movement from the linear code; and measuring, with the given resolution, a position of the scale embodiment with respect to the sensing head by obtaining information from a first number of the sensor signals of the relative movement, the first number of the sensor signals of the relative movement being smaller than a second number of sensor signals required for a position measurement with the given resolution at a relative speed of zero of the scale embodiment with respect to the sensing head.

2. The method according to claim 1, which comprises using only a given one of the at least one sensor when deriving the sensor signals of the relative movement.

3. The method according to claim 2, which comprises providing the given one of the at least one sensor in a central area of the sensing head.

4. The method according to claim 1, which comprises:
providing a plurality of sensors as the at least one sensor; and
selectively connecting and disconnecting given ones of the plurality of sensors as required during a measurement.

5. The method according to claim 1, which comprises:
providing a plurality of sensors as the at least one sensor; and
using all of the sensors in the sensing head for determining the absolute value of the initial position of the sensing head with respect to the scale embodiment at a given relative speed of the scale embodiment with respect to the sensing head, the given relative speed being substantially zero.

6. The method according to claim 1, which comprises:
providing a plurality of sensors as the at least one sensor; and
using all of the sensors in the sensing head for determining the absolute value of the initial position of the sensing head with respect to the scale embodiment at a low relative speed of the scale embodiment with respect to the sensing head.

7. The method according to claim 1, wherein:
the at least one sensor is a plurality of sensors;
the step of obtaining the absolute value of the initial position includes:
using a first number of the sensors for determining the absolute value of the initial position, the first number of the sensors is smaller than a second number of the sensors required for achieving the given resolution at the relative speed of zero of the scale embodiment with respect to the sensing head;
moving the sensing head and the scale embodiment relative to another by a given value ΔL in a accordance with a relation $$\Delta L \geq (N-n) \cdot L/2^N,$$

where N is the given resolution in bits, n is the first given number of sensors used and L is a code length of the linear code; and
deriving information required to achieve the given resolution from the sensor signals of the relative movement obtained with the first given number of the sensors.

8. The method according to claim 1, which comprises providing the absolute value of the initial position as a stored value obtained during a previous measurement.

9. The method according to claim 1, which comprises providing the absolute value of the initial position as an external value from outside.

10. The method according to claim 1, which comprises providing the linear code as a pseudo-random code.

11. The method according to claim 10, which comprises counting a sectional length of the pseudo-random code as a function of a direction for determining an absolute position.

12. The method according to claim 1, which comprises switching on a measurement electronic circuit at least once for a measurement evaluation period after sweeping over an entire sectional length of the linear code.

13. The method according to claim 1, which comprises storing a number of sectional lengths of the linear code that have been swept over.

14. The method according to claim 1, which comprises providing a fine resolution by using, in addition to the linear code, at least one incremental code for a measurement.

15. The method according to claim 1, which comprises performing the measuring step with an optical measurement transmitter.

16. A measurement transmitter, comprising:
a sensing head having at least one sensor;
a scale embodiment having a linear code;
said sensing head and said scale embodiment being movable with respect to one another;
said sensing head being configured for deriving, from said linear code, sensor signals of a relative movement of said scale embodiment with respect to said sensing head;
a first evaluator connected to said sensing head for determining an absolute value of an initial position of said scale embodiment with respect to said sensing head; and
a second evaluator connected to said sensing head for obtaining information about a position of said sensing head with respect to said scale embodiment from the sensor signals of the relative movement.

17. The measurement transmitter according to claim 16, wherein:
said at least one sensor is a plurality of sensors; and
said second evaluator obtains the information about the position of said sensing head with respect to said scale embodiment from sensor signals obtained from only one of said sensors.

18. The measurement transmitter according to claim 17, wherein:
said sensing head has a central area; and
said only one of said sensors is disposed in said central area.

19. The measurement transmitter according to claim 16, wherein:
said sensing head has a central area; and
said at least one sensor is disposed in said central area.

20. The measurement transmitter according to claim 16, wherein said at least one sensor is at least one photodiode.

21. The measurement transmitter according to claim 16, wherein said first evaluator for determining the absolute value of the initial position includes a storage device.

22. The measurement transmitter according to claim 16, wherein said first evaluator for determining the absolute value of the initial position includes a take-over device for receiving the absolute value of the initial position as an external value from outside.

23. The measurement transmitter according to claim 16, wherein said scale embodiment has a pseudo-random code as said linear code.

24. The measurement transmitter according to claim 16, wherein:

said linear code defines sectional lengths; and a storage device stores a number of said sectional lengths having been swept over.

25. The measurement transmitter according to claim 16, wherein said scale embodiment has, in addition to said linear code, at least one incremental code for providing a fine resolution.

26. The measurement transmitter according to claim 16, wherein said sensing head is an optical sensing head.

\* \* \* \* \*